United States Patent
Bledsoe

[15] 3,649,064
[45] Mar. 14, 1972

[54] COMBINATION HOUSE AND AUXILIARY TRAILER APPARATUS

[72] Inventor: Sherman H. Bledsoe, 2606 Rosewood Avenue, Apt. 4, Santa Ana, Calif. 92708

[22] Filed: Sept. 8, 1969

[21] Appl. No.: 855,906

[52] U.S. Cl..............................296/23 B, 214/500, 280/414
[51] Int. Cl............................................................B60p 3/32
[58] Field of Search..........................296/23 B, 23; 214/500; 280/414, 81

[56] References Cited

UNITED STATES PATENTS

| | | | |
|---|---|---|---|
| 2,847,136 | 8/1958 | Neff | 280/414 X |
| 3,486,786 | 12/1969 | Howarth | 296/23 B |
| 3,156,485 | 11/1964 | Delay | 280/81 |
| 3,556,582 | 1/1971 | Bledsoe | 296/23 |

*Primary Examiner*—Philip Goodman
*Attorney*—Fulwider, Patton, Rieber, Lee & Utecht

[57] ABSTRACT

A combination house and auxiliary trailer including a house trailer for mounting an enclosure and supported on a pair of wheels and including a forwardly projecting tongue for connection with a towing vehicle. An auxiliary trailer includes a pair of raisable support wheels and elevating means for raising them from a ground engaging position to a ground clearing position and, further, includes a rearwardly projecting tongue for connection with a towing vehicle. Support means is provided for engaging the front extremity of the auxiliary trailer with the rear extremity of the house trailer to support such auxiliary trailer cantileverally therefrom whereby the two trailers may be coupled together and the raisable wheels of the auxiliary trailer raised to their ground clearing position and the trailers towed as a unit. Alternatively, the raisable wheels may be lowered to their ground engaging position and the trailers uncoupled to be towed independently of one another. The enclosure may include an extendable portion which may be selectively extended when the trailers are separated to occupy the space occupied by the auxiliary trailer when the trailers are coupled together to thereby provide an enlarged enclosure for use as living quarters.

15 Claims, 18 Drawing Figures

Patented March 14, 1972
3,649,064
3 Sheets-Sheet 1
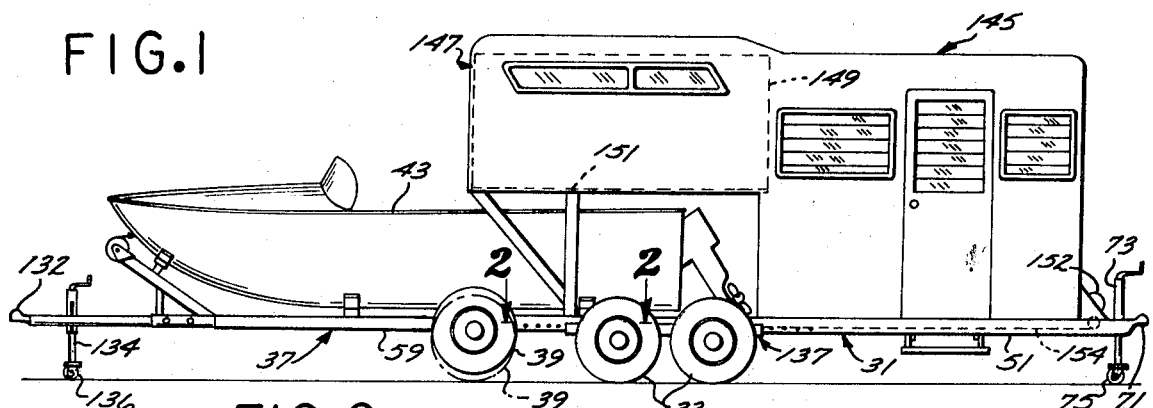
FIG.1
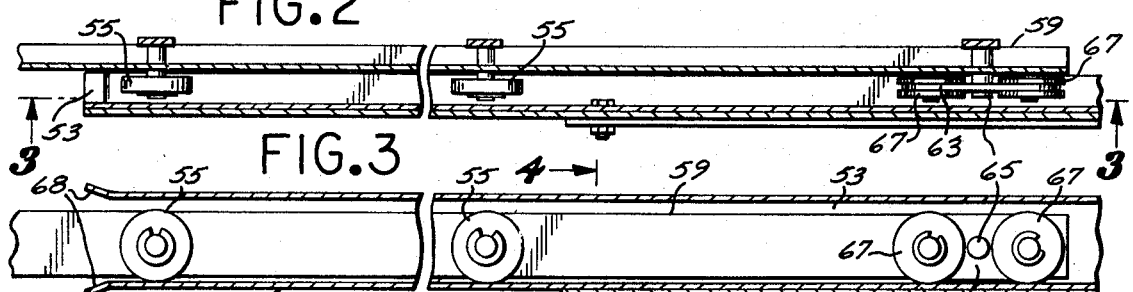
FIG.2
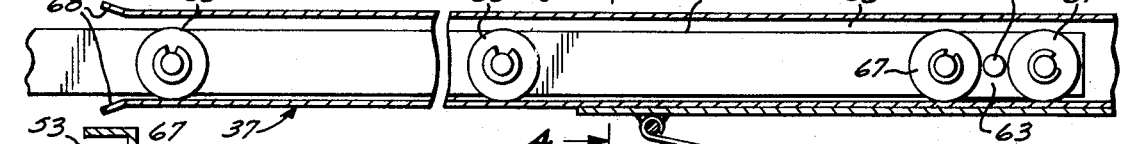
FIG.3
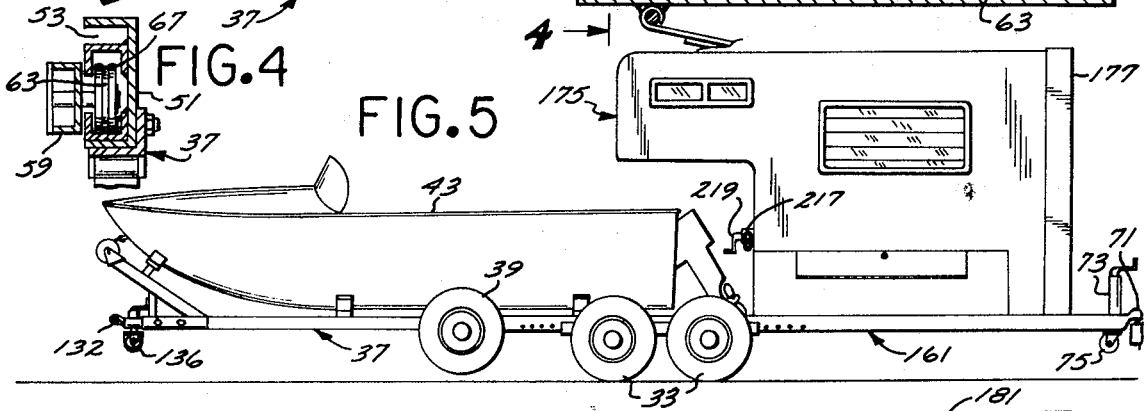
FIG.4
FIG.5
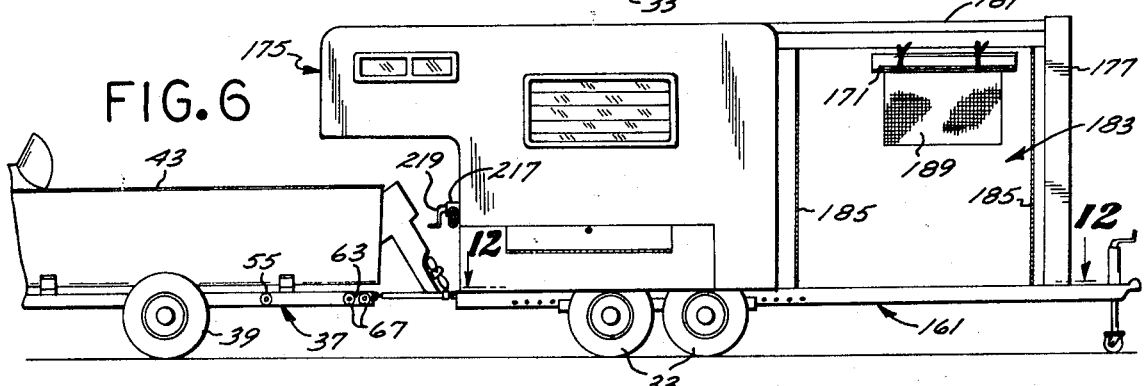
FIG.6
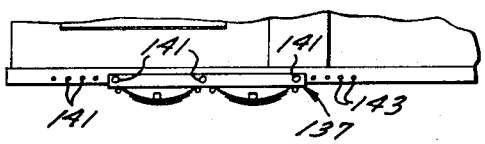
FIG.7
INVENTOR.
SHERMAN H. BLEDSOE
BY Fulwider, Patton, Rieber,
Lee and Utecht
ATTORNEYS Patented March 14, 1972

INVENTOR.
SHERMAN H. BLEDSOE

BY Fulwider, Patton, Rieber,
Lee and Utecht
ATTORNEYS

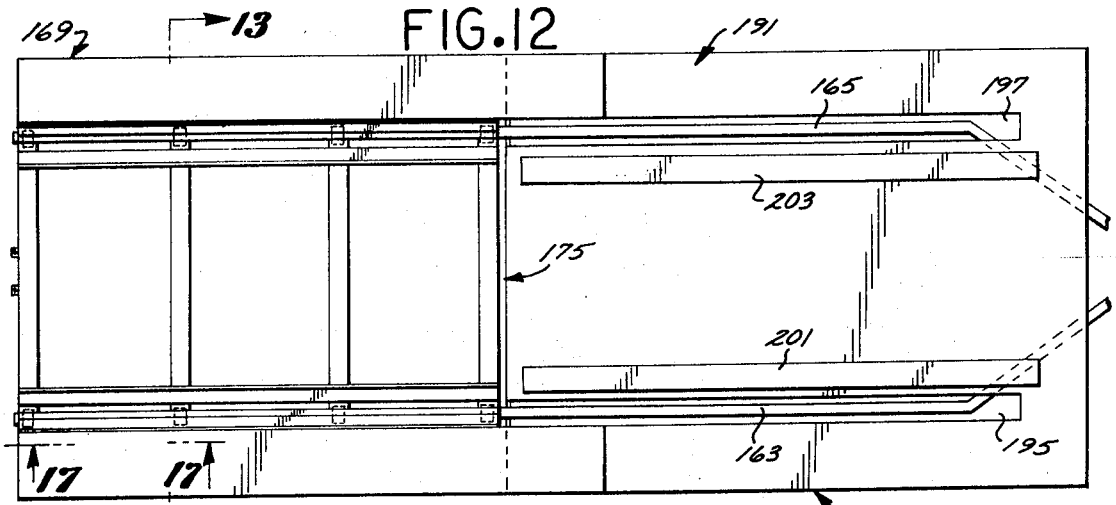
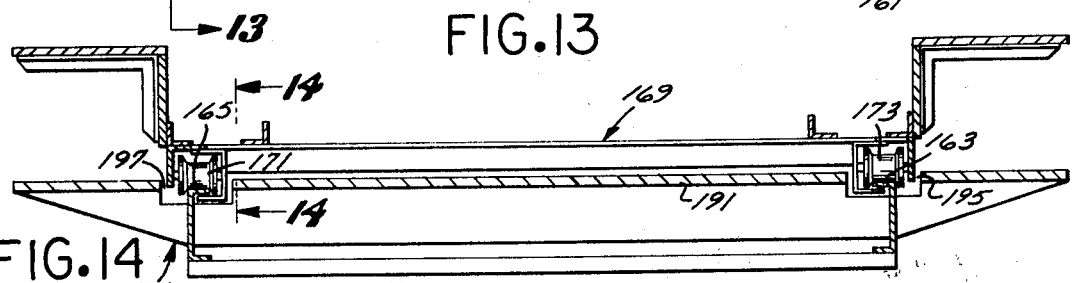
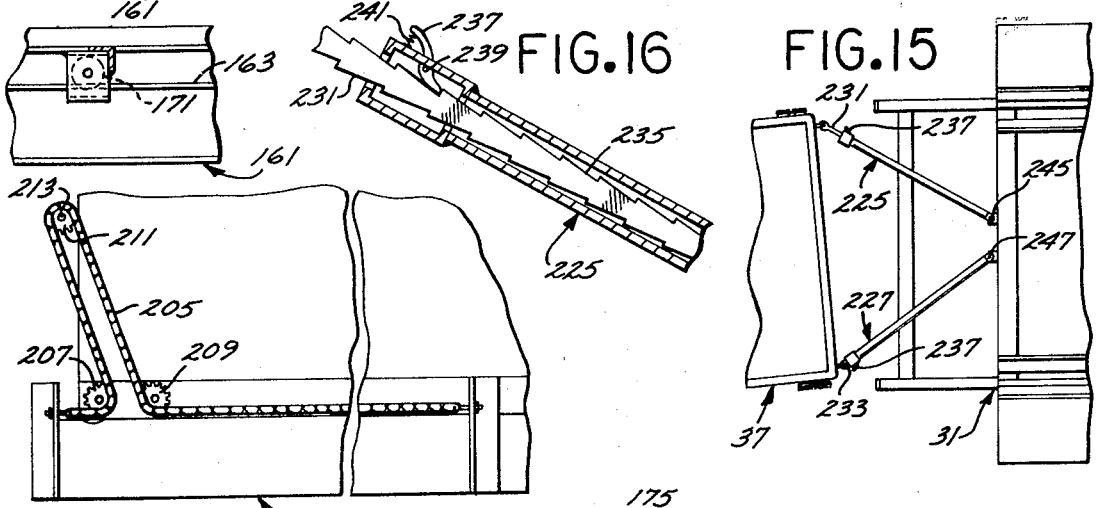
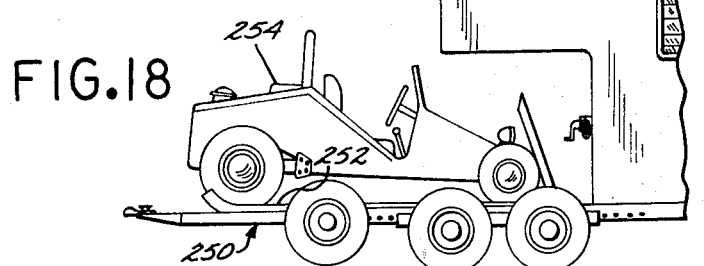
INVENTOR.
SHERMAN H. BLEDSOE 3,649,064

COMBINATION HOUSE AND AUXILIARY TRAILER APPARATUS

BACKGROUND OF THE INVENTION

1. Field of the Invention:

The present invention relates generally to trailers and more particularly to a pair of trailers which may be connected together and the wheels of one raised to a ground clearing position so one trailer is supported entirely from the other.

2. Description of the Prior Art:

My pending application Ser. No. 811,076, filed Mar. 27, 1969, now U.S. Pat. No. 3,556,582 issued Jan. 19, 1971, discloses a house and boat trailer combination wherein the house trailer and boat trailer may be coupled together for towing as a unit. However, combinations of this type suffer the shortcoming that the support wheels of both vehicles are in contact with the ground when the trailers are in their coupled condition thereby causing certain instability when the apparatus is towed. This instability renders the apparatus impractical for general use in many States because of the rather serious limitations placed thereon. For example, the California Vehicle Code Section No. 21715 specifies that it is illegal to tow such a combination with any passenger vehicle regardless of weight, or with any other motor vehicle having an unladen weight of less than 4,000 pounds.

SUMMARY OF THE INVENTION

The present invention is characterized by a house trailer for supporting an enclosure and is, itself, supported on a pair of support wheels and, further, including a forwardly projecting tongue, An auxiliary trailer supported from a pair of wheels which are movable between a lowered ground engaging position and a raised ground clearing position and means is provided for coupling the trailers together with the auxiliary trailer supported cantileverally from the house trailer whereby such trailers may be coupled together and the auxiliary trailer wheels raised to their ground clearing position and the combination of trailers towed as a unit.

An object of the present invention is to provide a trailer apparatus of the type described which includes one trailer for supporting an enclosure defining living quarters and a second trailer for supporting a boat whereby the apparatus may be towed as a unit or, alternatively, either of said trailers may be towed independently of the other.

It is another object of the present invention to provide an apparatus of the type described wherein the wheels of the auxiliary trailer may be elevated to a position clear of the ground when such trailers are coupled together.

It is a further object of the present invention to provide an apparatus of the type described wherein the enclosure mounted on the house trailer may be conveniently expanded to form an enlarged closure.

It is still another object of the present invention to provide a trailer apparatus of the type described that includes means fro conveniently aligning the trailers for being coupled together.

These and other objects and the advantages of the present invention will become apparent from a consideration of the following detailed description when taken in conjunction with the accompanying drawings.

DESCRIPTION OF THE DRAWINGS

FIG. 1 is an elevational side view of a combination house and auxiliary trailer embodying the present invention;

FIG. 2 is a broken horizontal sectional view, in enlarged scale, taken along the line 2—2 of FIG. 1;

FIG. 3 is a broken vertical sectional view taken along the line 3—3 of FIG. 2;

FIG. 4 is a vertical sectional view, in enlarged scale, taken along the line 4—4 of FIG. 3;

FIG. 5 is an elevational side view of a second embodiment of the combination house and auxiliary trailer of present invention;

FIG. 6 is an elevational side view of the combination house and auxiliary trailer shown in FIG. 5, the enclosure on the house trailer being shown in an extended position;

FIG. 7 is a vertical sectional view of the house trailer frame included in the combination house and boat trailer apparatus shown in FIG. 1, such view being taken directly behind the supporting tires;

FIG. 12 is a horizontal sectional view, in enlarged scale, taken along the line 12—12 of FIG. 6;

FIG. 13 is a vertical sectional view, in enlarged scale, taken along the line 13–13 of FIG. 12;

FIG. 14 is a vertical sectional view taken along the line 14—14 of FIG. 13;

FIG. 15 is a diagrammatic plan view of coupling bars included in the combination house and boat trailer apparatus shown in FIG. 1;

FIG. 16 is a vertical sectional view, in enlarged scale, taken longitudinally through the coupling bars shown in FIG. 15;

FIG. 17 is a broken vertical sectional view, in enlarged scale, taken along the line 17—17 of FIG. 12;

FIG. 18 is a partial elevational side view of a modification of the combination house and auxiliary trailer apparatus shown in FIG. 5.

DESCRIPTION OF THE PREFERRED EMBODIMENT

Figure 8:
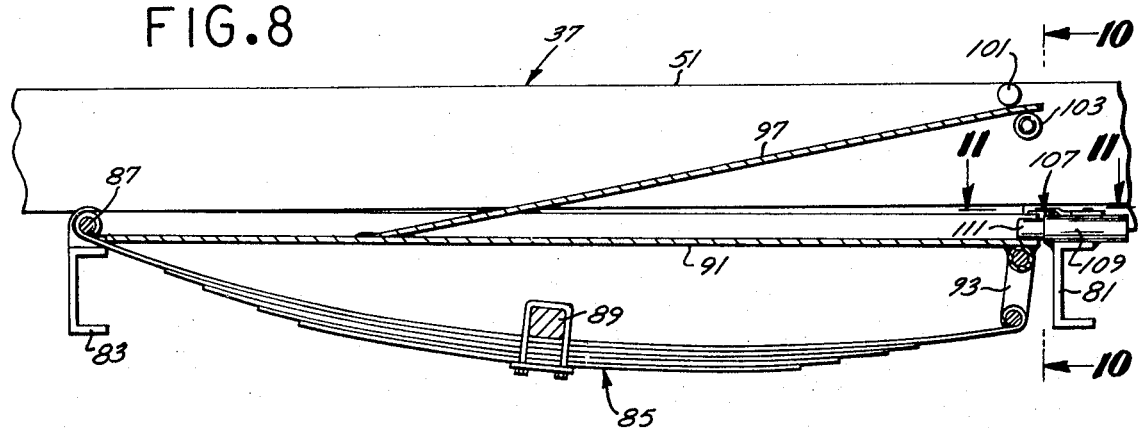
FIG. 8 is a vertical sectional view, in enlarged scale, of an elevating means utilized to raise and lower the wheels included in the auxiliary trailer shown in FIG. 1.

The combination house and auxiliary trailer apparatus of present invention includes, generally, a house trailer 31 supported on a pair of tandem wheels 33 and an auxiliary trailer 37 including raisable wheels 39 which may be lowered selectively to the ground engaging position shown in broken lines in FIG. 1 for supporting such trailer 37 or, alternatively, may be raised to the elevated position shown in solid lines when the trailers 31 and 37 are coupled together thereby leaving the trailer 37 supported cantileverally from the rear extremity of the house trailer 31 and when a campsite, or the like, is reached, the house trailer 31 may be parked and the wheels 39 of the auxiliary trailer 37 lowered to their ground engaging position and the trailers uncoupled so the auxiliary trailer 37 may be towed independently of the house trailer 31 for transporting a boat 43, or the like, thereby enabling the house trailer 31 to remain parked and freeing the towing vehicle for transportation and/or towing of the trailer 37.

The frame of the house trailer 31 includes a pair of parallel inwardly opening side channels 51 which have confronting C-channels affixed in the rear extremities thereof to define tracks 53 (FIGS. 2–4) which are open at their rear extremities for receipt of rollers 55 carried on similar side channels 59 of the auxiliary trailer 37. Supported adjacent the forward extremity of the side channels 59 of the auxiliary trailer 37 is a mounting bracket 63 supported on a pivot pin 65 and carrying rollers 67 disposed at opposite ends thereof whereby such bracket 63 is free to rotate on its pivot pin 65 to angle the bracket 63 for alignment of the rollers 67 to ride on the flares 68 formed at the rear extremity of the respective tracks 63.

The side channels 51 angle inwardly at their front extremity and are connected together to form a tongue carrying a hitch socket 71. A jack 73 is carried from the tongue and has a castor wheel 75 mounted on its bottom end so the trailer 31 can be maneuvered around while its front end is supported on such jack.

Figure 9:
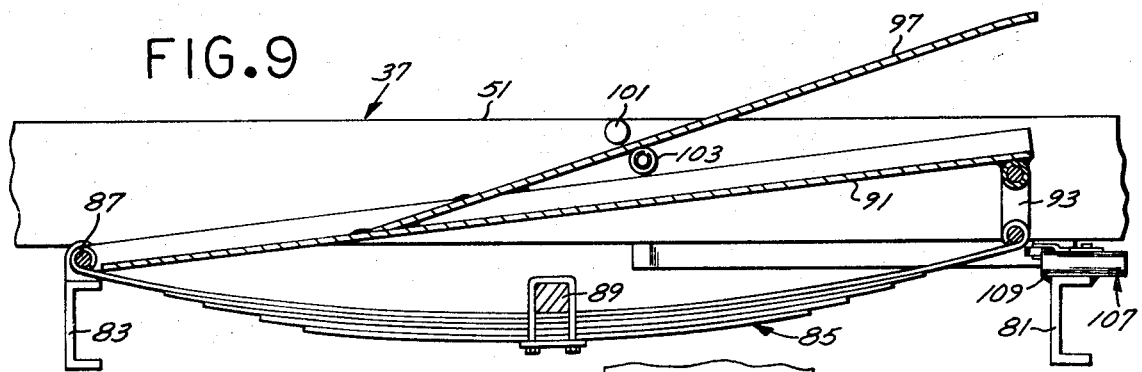
FIG. 9 is a vertical sectional view similar to FIG. 8 but showing the elevating means in a raised position.
Figure 10:
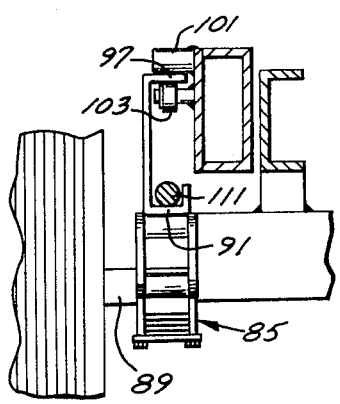
FIG. 10 is a vertical sectional view taken along the line 10—10 of FIG. 8.

Referring to FIGS. 8 and 9, the auxiliary trailer 37 includes a pair of intermediate transverse front and rear channels 81 and 83, respectively, which are welded on their opposite ends to the longitudinal channels 59. A laminated leaf spring assembly 85 is pivotally carried at its rear extremity from a pivot pin 87 mounted on the rear transverse channel 83 and includes a framework formed by a forwardly and rearwardly extending angle 91 having its front extremity connected with the front extremity of the laminated leaf spring by means of a vertical link 93. Rigidly affixed to the horizontal angle 91 intermediate its ends is an upwardly and forwardly projecting angle forming a ramp 97 for receipt between a cylindrical slider 101 mounted on the channel 51 of the house trailer 31 and a lifting roller 103, likewise, mounted on such channel 51.

Figure 11:
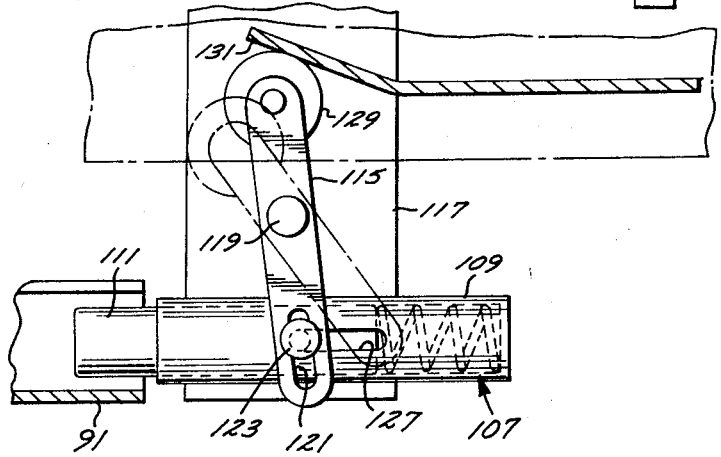
FIG. 11 is a horizontal sectional view, in enlarged scale, taken along the line 11—11 of FIG. 8.

Referring to FIGS. 9 and 11, affixed to the upper side of the transverse channel 81 is a lock, generally designated 107, which includes a rearwardly opening barrel 109 that contains a reciprocable bolt 111 which is biased rearwardly to normally project over the forward extremity of the horizontal angle 91. Still referring to FIG. 11, a horizontally disposed actuating arm 115 is pivotally carried intermediate its ends from a mounting bracket 117 by means of a pivot pin 119 and has its one end formed with a slot 121 which receives a pin 123 extending from the reciprocable bolt 111 and through a longitudinal slot 127 in the wall of the barrel 109. The opposite extremity of the actuating arm 115 carries a roller 129 which engages an angled stop 131 mounted on the house trailer 31 when the trailers are brought into engagement with one another whereby the reciprocable bolt 111 will be retracted to enable the auxiliary trailer wheels 39 to be raised to their ground clearing position.

Referring to FIG. 1, the side channels 59 of the auxiliary trailer 37 are angled together at their rear extremity to form a towing tongue which mounts a hitch socket 132. A jack 134 is carried from the tongue and carries a castor wheel 136 on its bottom extremity. Formed pads 138 are mounted on the trailer 37 to receive the boat 43.

Referring to FIGS. 1 and 7, an undercarriage, generally designated 137, includes a pair of longitudinal side angles which support the side channels 51 of the house trailer 31. The side angles of the undercarriage 137 include three removable adjustment pins 141 which are received in selected ones of a plurality of bores 143 in the side channels 51 of the house trailer 31 to maintain the undercarriage in longitudinal adjustment under such trailer to provide the desired weight distribution on the wheels 33.

The house trailer mounts an enclosure, generally designated 145, which has an elevated rearwardly projecting open bottom overhang 147 that includes an open top telescopical section 149 formed with a floor 151 whereby such section may be telescoped downwardly when the auxiliary trailer 37 is disconnected from the house trailer 31 to position the floor 151 coplanar with the floor in the remainder of the enclosure 145 and cooperate with the overhang 147 to thereby provide extended living room within the enclosure 145. A winch 152 is mounted at the front of the enclosure 145 and winds a cable 154 thereon which extends rearwardly under the enclosure for coupling with the front of the auxiliary trailer 37.

In operation, the house trailer 31 may be positioned with its jack 73 lowered to maintain the frame horizontal as shown in FIG. 1 and the retractable section 149 may be telescoped upwardly into the overhang 147 by a winch or any other acceptable means. The auxiliary trailer 37 may then be backed into position at the rear of the house trailer 31, the cable 154 attached thereto, and the winch 154 rotated to draw the front extremity of the auxiliary trailer telescopically into the rear extremity of the house trailer. As the trailers 31 and 37 are drawn together the lead rollers 67 will engage the respective flares 68 and pivot the brackets 63 to lead the remaining rollers 55 into the respective tracks 53 where they will be retained by the C-channels to cantileverally support the trailer 37.

Referring to FIG. 11, as the auxiliary trailer 37 is moved forwardly into engagement with the rear extremity of the house trailer 31, the lock 107 will be actuated by the roller 129 on the actuating arm 115 engaging the inclined stop 131 to thereby pivot such actuating arm to retract the bolt 11 clear of the front extremity of the horizontal angle 91 of the laminated leaf spring assembly 85. Immediately after the bolt 111 is retracted, the ramp 97 (FIG. 8) engages the lifting roller 103 and continued telescoping of the auxiliary trailer 37 into the rear extremity of the boat trailer 31 causes the rear extremity of the laminated leaf spring assembly 85 to be lifted upwardly into the position shown in FIG. 9 thereby raising the wheels 39 and transferring the entire weight of the auxiliary trailer to the rollers 55 on the track 53 and, further, raising the wheels 39 to their ground clearing position shown in solid lines in FIG. 1.

A towing vehicle may be then connected to the hitch socket 71 of the house trailer 31 and the entire combination towed as a unit. It is of particular importance that the auxiliary trailer wheels 39 are raised clear of the ground to thereby reduce instability and assure that the combination may be towed by a conventional passenger vehicle. Further, it should be noted that the telescoping together of the trailers 31 and 37 provide a relatively short overall length thereby bringing the combination within the restrictions of many vehicle codes for towing by passenger vehicles and without a special operator 'permit.

When the destination is reached, as for instance a trailer park, the trailer 31 may be parked and the auxiliary trailer 37 uncoupled therefrom and such auxiliary trailer moved clear of the house trailer 31. Referring to FIG. 9, as the boat trailer 37 is moved rearwardly, the upwardly and rearwardly projecting ramp 97 will engage the overlying slider 101 carried from the house trailer 31 and will force such ramp downwardly thereby pivoting the laminated leaf spring assembly 85 downwardly about the pivot pin 87 thereby lowering the axle 89 and bringing the wheels 39 into engagement with the ground and transferring the weight of the boat trailer 37 from the rollers 55 in the tracks 53 to such wheels. As the laminated leaf spring assembly 85 reaches its lowest position shown in FIG. 8, the roller 129 (FIG. 11) will clear the stop 131 and enable the reciprocable bolt 111 to be biased forwardly to thereby engage above the rear extremity of the horizontal angle 91 to lock the spring assembly 85 to its lowered position and maintain the wheels 39 locked down. The auxiliary trailer 37 may then be towed to transport the load, for instance, the boat 43. Further, the telescopical portion 149 of the enclosure 145 may be lowered to provide additional living space.

Referring to FIGS. 5 and 6, the house and auxiliary trailer combination shown therein is similar to that shown in FIG. 1 except that it includes a boat trailer, generally designated 161, which is formed with parallel forwardly and rearwardly extending rails 163 and 165 (FIGS. 13 and 16) which mount a camper carriage, generally designated 169, by means of respective rollers 171 and 173. Mounted on the carriage 169 is a modification of a conventional camper, generally designated 175. Supported at the front extremity of the house trailer 161 is a false end wall 177. Referring to FIG. 6, connected between the false end wall 177 and the rear wall of the camper 175 are canvas top and side walls 181 and 183, respectively, which are extended by the rearward movement of the camper 175 on the rearwardly moving carriage 169 to form a temporary closure at the forward extremity of the camper 175.

One side wall 183 includes vertical zippers 185 on opposite ends thereof for being unzipped to form a canopy which may have its bottom extremity stretched outwardly to a covering position. The same side wall 183 includes a transparent window 189 which has a rolled blind 171 secured thereover.

Referring to FIG. 13, a false floor, generally designated 191, is affixed to the front portion of the house trailer 161 and include a pair of parallel longitudinal slots 195 and 197 which are aligned over the respective rails 163 and 165 for projection of the rollers 173 when the camper 175 is moved forwardly over such floor 191. The floor 191 is conveniently carpeted and a pair of inserts 201 and 203 are provided for insertion in the respective slots 163 and 165 and are also carpeted to match the carpeting of the floor 191.

Referring to FIG. 17, a drawing chain 205 extends along one side of the house trailer 161 and has its opposite ends affixed thereto. A pair of adjacent idler sprockets 207 and 209 are supported from the enclosure 175 and the intermediate portion of the chain 205 extends upwardly therebetween and threads over a drive sprocket 211 supported on one end of a horizontal shaft 213 disposed intermediately at the front of the camper 175. Referring to FIG. 6, the opposite end of the horizontal shaft 213 is coupled with a gear box 217 which has a drive handle 219 connected therewith for rotation of the shaft 213 to move the camper forwardly and rearwardly on the trailer 161.

Referring to FIGS. 15 and 16, a pair of telescopical bars, generally designated 225 and 227, are pivotally connected at their rear extremity to the front of the auxiliary trailer 37 and include respective extendable rods 231 and 233 which are formed with ratchet teeth 235 which are engaged by a pawl 237 carried on a pivot pin 239 and biased to its latching position by a compression spring 241. The front extremities of the bars 225 and 227 may be secured to the rear extremity of the camper 175 by means of connecting bolts 245, and 247, respectively.

Thus, the house and auxiliary trailers shown in FIGS. 5 and 6 are coupled together and the auxiliary trailer wheels 39 elevated to the position shown in FIG. 5 for convenient towing of the unit from the tongue of the house trailer 161. Again, when the destination is reached the house trailer 161 is parked and the auxiliary trailer 37 uncoupled therefrom. Such uncoupling may be accomplished by rotating the drive crank 219 to move the camper 175 rearwardly on the rails 163 and 165 thereby stretching the canvas walls 181 and 183 whereby such walls will cooperate with the false end wall 177 and false floor 191 to provide a room at the front end of the camper 175. The inserts 201 and 203 may then be placed in the respective slots 163 and 165 to provide a uniform floor. Paraphernalia stored in the camper 175 may then be moved onto such floor to thereby leave the camper free for cooking, eating and the like.

With the auxiliary trailer 37 in the position shown in FIG. 6, the front extremity of the coupling bars 225 and 227 may then be disconnected from the rear extremity of the camper 175 and such coupling bars pivoted to a storage position extending transversely across the front of the auxiliary trailer 37. The auxiliary trailer 37 is then free to be towed independently and, also, the towing vehicle is freed from the trailer 161 for independent transportation.

When the trailers 31 and 37 are to be coupled together, the auxiliary trailer 37 may be backed into position at the rear of the house trailer 31 and the front extremities of the coupling bars 225 and 227 connected with such house trailer. In this regard, it is important that the coupling bars 225 and 227 are pivotable and may be telescoped whereby the trailers may be slightly out of alignment, as shown in FIG. 15, and the coupling bars 225 and 227 connected therewith. The trailers may then be easily aligned and continued backing of the auxiliary trailer 37 will telescopically collapse both coupling bars 225 and 227 and the ratchet pawls 237 will prevent extension thereof. With the inserts 201 and 203 (FIG. 12) removed, the drive crank 219 (FIG. 6) may be rotated to pull the camper 175 forwardly on the trailer 161 thereby pulling the auxiliary trailer 227 into telescopical engagement with such house trailer 161 and raising the wheels 39 to their ground clearing position as described hereinabove.

The house and auxiliary combination shown in FIG. 18 is similar to that shown in FIG. 5 except that the auxiliary trailer, generally designated 250, includes a pair of parallel ramps 252 which receive the wheels of a dune buggy 254 whereby such dune buggy may be transported in conjunction with the camper 175.

From the foregoing it will be apparent that the combination house and auxiliary trailer of present invention provide a particularly convenient means for towing a house trailer or camper and boat behind a conventional passenger vehicle. Further, the combination is separable when the destination is reached whereby the house trailer may be parked and the towing vehicle will be free for general conveyance thereby eliminating the inconvenience normally associated with a camper wherein the camper must be readied for travel whenever any errands are to be run or a boat trailer is to be towed to or from a launching area. Also, the wheels of the auxiliary trailer are automatically raised when the trailers are coupled together. Further, the telescopical interconnection of the trailers, in conjunction with extension of collapsible portions of the closure, provide extra room which would not normally be available in conventional campers.

Various modifications and changes may be made with regard to the foregoing detailed description without departing from the spirit of invention.

I claim:

1. Combination house and auxiliary trailer apparatus for use with an enclosure defining living quarters, said apparatus comprising:

a house trailer for carrying said enclosure and including a first pair of wheels supporting said house trailer and formed with a forwardly projecting tongue for connecting the front end of said house trailer to a towing vehicle;

an auxiliary trailer including raisable wheels for supporting said auxiliary trailer when it is uncoupled from said house trailer;

elevating means permanently mounting said raisable wheels on said auxiliary trailer and operative to selectively lower said raisable wheels to a ground engaging support position and to raise said raisable wheels to a ground clearing position;

coupling means for coupling the front extremity of said auxiliary trailer to the rear extremity of said house trailer to support said auxiliary trailer cantileverally from said house trailer with the rear extremity of said auxiliary trailer projecting rearwardly from said house trailer whereby said house and auxiliary trailers may be coupled together and said elevating means operated to raise said raisable wheels to said ground clearing position so said apparatus may be towed as a unit and, alternatively, said raisable wheels may be lowered to their ground engaging position to support said auxiliary trailer and said auxiliary trailer uncoupled from said house trailer and towed independently therefrom.

2. Combination house and auxiliary trailer apparatus is set forth in claim 1 wherein:

said auxiliary trailer includes means for supporting a boat thereon.

3. Combination house and auxiliary trailer apparatus as set forth in claim 1 wherein:

said elevating means includes an axle carrying said raisable wheels on its opposite extremities, a lock carried on said auxiliary trailer for engaging said elevating means to lock said raisable wheels in their ground engaging position and including an actuating arm; and a stop supported on said house trailer for engaging said actuating arm during coupling together of said trailers to release said lock and free said raisable wheels to be elevated to their ground clearing position.

4. Combination house and auxiliary trailer apparatus as set forth in claim 1 wherein:

said elevating means includes a vertically movable member connected with said raisable wheels, a forwardly and upwardly inclined ramp affixed to said movable member, and a lifter mounted on said house trailer for engagement under said ramp during coupling together of said trailers to lift said ramp and raise said movable member to elevate said raisable wheels to their ground clearing position.

5. Combination house and auxiliary trailer apparatus as set forth in claim 1 wherein:

said coupling means includes a pair of telescopical bars pivotally connected on their respective rearward extremities to the forward extremity of said house trailer and including latching means for latching said respective bars in selected telescoped positions;

and said auxiliary trailer includes means on its front extremity for coupling the rear extremity of said respective bars thereto whereby said auxiliary trailer may be backed into position adjacent said house trailer, said bars extended and coupled with said auxiliary trailer and said auxiliary trailer backed farther toward said house trailer to telescope said bars and said latching means latched to latch said bars in their telescoped position.

6. Combination house and auxiliary trailer apparatus as set forth in claim 1 wherein:

said enclosure includes a false end wall, a false floor fixed in position and a movable enclosure portion selectively movable longitudinally to a position over said false floor and to an extended position at one end of said false floor and collapsible walls interconnecting the side and top walls of said movable portion with said false end wall whereby said collapsible walls will cooperate with said false end wall and said movable portion when said movable portion is in its extended position to form additional living space.

7. Combination house and auxiliary trailer apparatus as set forth in claim 1 wherein:

said house trailer includes a pair of transversely spaced apart rearwardly projecting tracks; and said auxiliary trailer includes rollers carried on opposite sides thereof for receipt in said tracks.

8. Combination house and auxiliary trailer apparatus as set forth in claim 1 wherein:

said elevating means includes a lever arm pivotally connected at its rearward extremity to said house trailer and projecting forwardly from its connecting point, axle means mounting said raisable wheels on said lever arm, an upwardly and forwardly projecting ramp affixed to said lever arm and a lifter mounted on the rear extremity of said lever arm and elevate said raisable wheels to their ground clearing position thereby transferring the weight of said auxiliary trailer to said house trailer.

9. Combination house and auxiliary trailer apparatus as set forth in claim 1 wherein:

said elevating means includes a vertically movable member connected with said raisable wheels, a forwardly and upwardly inclined ramp affixed to said movable member and a slider mounted on said house trailer for engagement on the top surface of said ramp to force said movable member downwardly as said trailers are moved apart to lower said raisable wheels to their ground engaging position.

10. Combination house and auxiliary trailer apparatus as set forth in claim 1 wherein:

said house trailer includes a wheel mount carried by said first pair of wheels and shiftable longitudinally with respect to said house trailer and means for securing said wheel mount in selected positions relative to said house trailer whereby said wheels included in said house trailer may be shifted longitudinally under said house trailer to adjust the weight distribution thereon.

11. Combination house and auxiliary trailer apparatus as set forth in claim 3 wherein:

said lock includes a bolt normally biased to its extended position for engagement with said movable member to lock said raisable wheels in their ground engaging position and coupled with said actuating arm.

12. Combination house and auxiliary trailer apparatus as set forth in claim 4 wherein:

said house trailer includes means for drawing said auxiliary trailer into position for coupling therewith.

13. Combination house and auxiliary trailer apparatus as set forth in claim 4 wherein:

said house trailer includes a slider for engagement over said ramp for urging it downwardly during uncoupling of said trailers to lower said raisable wheels to their ground engaging positions.

14. Combination house and auxiliary trailer apparatus as set forth in claim 5 wherein:

said telescopical bars include ratchet means providing for free collapse of said bars and normally limiting extension thereof.

15. Combination house and auxiliary trailer apparatus as set forth in claim 6 wherein:

said end wall is disposed at The front extremity of said house trailer and said house trailer is formed with transversely spaced apart, longitudinally projecting rails for supporting said movable portion for rearward movement to said extended position; and the forward extremity of said auxiliary trailer is formed for being received between said rails when said trailers are coupled together.

* * * * *